UNITED STATES PATENT OFFICE.

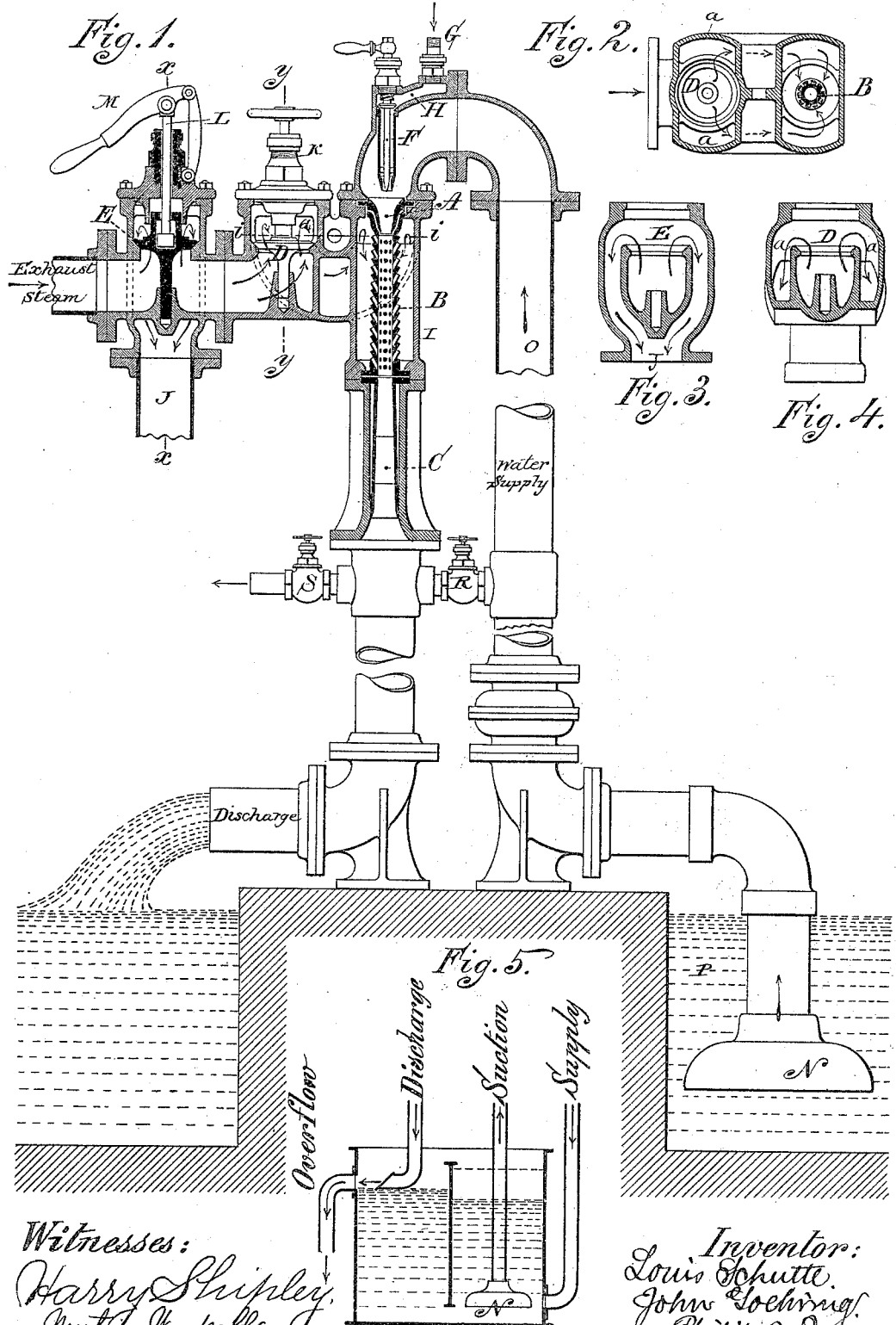

LOUIS SCHUTTE AND JOHN GOEHRING, OF PHILADELPHIA, PENNSYLVANIA; SAID GOEHRING ASSIGNOR TO SAID SCHUTTE.

STEAM-JET CONDENSER.

SPECIFICATION forming part of Letters Patent No. 285,846, dated October 2, 1883.

Application filed May 12, 1883. (No model.)

*To all whom it may concern:*

Be it known that we, LOUIS SCHUTTE and JOHN GOEHRING, of Philadelphia, in the county of Philadelphia and State of Pennsylvania, have invented certain Improvements in Steam-Jet Condensers, of which the following is a specification.

The present invention has reference to that class of condensers commonly known in the art as "jet-condensers," wherein the action of the exhaust-steam induces the current of the condensing-water, combines therewith, and in so doing produces a vacuum by reason of its rapid condensation.

Our invention relates to the peculiar formation and combination of parts which comprise the condenser, by which a more perfect action of the same is obtained, and by which its action for the purposes of condensation and of inducing current is made practicable and advantageous under varying circumstances.

In the accompanying drawings, Figure 1 represents in elevation, partly in section, a condenser with our improvements embodied therein. Fig. 2 is a sectional plan on the line *i i*; Fig. 3, a vertical cross-section on the line *x x*; Fig. 4, a vertical cross-section on the line *y y*. Fig. 5 is a sectional view illustrating a modification of the ends of the discharge and suction pipes.

As represented in the drawings, the condenser proper is comprised in the water-nozzle A, the induction-tube B, and the discharge-tube C, the axes of which coincide. The water enters through the central nozzle, A, and passes thence through the induction-tube B, and discharges through the expanding-tube C, while the exhaust-steam or other vapors to be condensed surround the induction-tube B and pass through the series of perforations or spaces in the same, whereby they are caused to induce a forward motion of the jet and to combine therewith in such manner as to be condensed thereby.

As shown in the drawings, the induction-tube B is constructed with its bore or passage of practically uniform diameter from end to end, and is provided with a large number of openings or inlets, each having a forward inclination toward the center. It is surrounded by a body or casing, I, which communicates by valves, hereinafter explained, with a pipe, through which exhaust-steam or other vapor is conducted to the apparatus.

As shown, the passage for the exhaust-steam is fitted with a check-valve, D, opening in the direction of the current of the exhaust-steam or vapor toward the induction-tube, the valve closing automatically against a reverse pressure, and thereby preventing the possibility of admitting water into the steam-pipe. We arrange this check-valve in a vertical position, in order that it may close by gravity. The passage *a*, from above the valve to the case or body inclosing the induction-tube, extends from two opposite sides above the valve, and enters the case around the induction-tube on opposite sides, as shown in Figs. 1, 2, and 4, the object of this construction being to secure a vertical and uniform action of the current on the check-valve, so that it may be lifted squarely from its seat, as well as a symmetrical and properly-divided admission of the exhaust-steam to the induction-tube. The passages *a* need not be directly opposite each other, as here shown, but may be annular or of other form, provided their form is such as to cause the steam to lift the valve directly from its seat by a pressure beneath its opposite sides or edges. The object gained is that of making the action of the check-valve and the condenser more certain and efficient.

Above the check-valve D we mount a screw stem or spindle provided with a hand-wheel, by means of which it may be set downward to limit the rising action of the valve D, or to hold the same securely in a closed position. We also provide the steam-admission pipe in advance of the check-valve D with a self-acting exhaust-valve, E, made in the form of a puppet or check valve, and communicating through a pipe, J, with the atmosphere. The form of this valve, its seat, and passages are clearly represented in Figs. 1 and 3. The tendency of the vacuum caused in the condenser and communicating passages is to keep the valve E closed; but in the event of the vacuum being destroyed while the condenser is not in action, for want of water or for other reasons, the resulting steam-pressure will open the valve, and the exhaust-steam will escape through the same into the atmosphere.

The valve E is united, as shown, by a loose connection to a rod, L, the upper end of which, passing through a stuffing box or gland, is connected to a hand-lever, M, on the outside. The rod may bear with sufficient friction in the stuffing-box to remain in the position in which it may be placed, or suitable locking devices may be combined with the lever to secure the rod in position. As shown in the drawings, the lower end of the rod is provided with a head or enlargement seated in a vertical pocket in the valve, so that the valve is permitted a limited vertical motion independent of the rod or spindle. If, now, the spindle be depressed, it will serve to hold the valve to its seat. If lifted to the full extent, it will raise the valve from the seat; but if placed in an intermediate position it will permit the valve to open and close without restraint.

At or above the upper end of the water-nozzle A, I connect the upper curved end of the water-supply pipe O, which is extended downward to a cistern or other source of supply, P. The upper end of the water-pipe is provided with a steam-inlet nozzle, F, having a spindle to control the admission of the steam. This nozzle is arranged above and in line with the axis of the water-nozzle A, and its purpose is to introduce a jet of live steam, to form, in conjunction with the water-nozzle A, an air-exhauster, whereby the water may be drawn upward through the suction-tube and directed downward through the induction-tube B, to establish the operation of the apparatus. The steam-jet may also be used when the peculiar conditions are such as to require it to assist in maintaining the current of water through the induction-tube. The steam-nozzle will not be required after the condenser is in operation, provided the inductive action of the exhaust-steam is sufficient to maintain the current of water. Should circumstances, however, require a permanent assistance to the current, this steam-nozzle, having its jet properly regulated by means of the spindle, will answer an excellent purpose.

For the purpose of exhausting the suction-pipe and bringing the water in the first instance into the condenser, as described above, it is necessary that there shall be a free discharge from the steam-nozzle F. This is secured in most cases through the water-nozzle, the induction and discharge tubes, and out through the tail-pipe. Should the discharge, however, be under water, or so constructed as to form a trap, or for any other reason be closed, we provide a starting-valve, S, below the discharge-tube C. This tube, opening into the atmosphere and kept open until the current of water is established, will provide for the free discharge, and prevent the counter-pressure which will otherwise occur and oppose the passage of water through the combining-tube. We further provide the apparatus with a communication between the suction or water-supply pipe O and the discharge-pipe, the means of communication consisting, in the present instance, of a pipe, R, provided with a valve, by which it may be closed. This valve, being properly adjusted, affords a means of regulating the water-consumption of the condenser to suit the temporary or permanent requirements.

The provision of means for regulating the water-consumption as varying conditions may require is of the greatest importance. The action of a jet-condenser is such that a full current must pass through it without respect to the amount of work to be done or the amount of steam to be condensed. Consequently the amount of water which must pass through a given condenser is subject to but little variation. If the quantity of steam admitted is variable, the temperature of the discharge-water will vary accordingly, and where the quantity of steam is less than could be properly condensed by the amount of water it will pass away in the discharge at a lower temperature than is necessary, and consequently an unnecessary amount of water is circulated. The adjustable connection R is admirably adapted to provide against this contingency by admitting part of the discharge-water into the suction-pipe, to be used over again, thereby reducing the consumption from the original supply. This regulation not only secures an economical action of the apparatus, but is also advantageous in that it permits a given condenser to be adjusted for an economical condensation of a greater or a less quantity of steam, as may be required.

In practice it is preferable to place the communication R immediately below the condenser. It may, however, be placed anywhere between the suction and discharge; or the discharge may be run into the same vessel from which the supply of water is drawn, such vessel being provided with an overflow, which delivers an amount of water equal to that of the fresh water admitted. Such an arrangement is represented in Fig. 5, the supply and suction tubes communicating with a chamber in one side of the reservoir, while the discharge and overflow pipes communicate with a chamber in the opposite side, the two chambers being, however, in communication with each other at the base.

Referring again to the steam-nozzle F, it is to be noted that it terminates above the water-nozzle or otherwise in such relation thereto that the suction produced by the jet of live steam from said nozzle will be confined to the space above the water-nozzle. In other words, the apparatus is to be constructed in such manner that the jet of live steam from the nozzle F will not have the effect of producing an inward suction through the openings of the combining-tube B. It is the design of the apparatus to have the steam-jet operate simply as a means of delivering the water through the combining-tube, and have the steam or vapor which enters through the lateral openings of the combining-tube assist in moving the water, instead of having the water induce the inward flow of the steam.

The present invention is restricted to those matters and things which are hereinafter claimed, and as to all matters which may be described or shown, but which are not claimed, the right is reserved to make the same the subject of a separate application.

We are aware that an outwardly-opening valve has been located upon a steam-supply pipe in advance of a suction-pipe, and this we do not claim, our invention being restricted to the combination of such relief-valve with a jet-condenser in which the combination of the valve has a peculiar function and secures peculiar results not secured by its combination with the pump.

Having thus described our invention, what we claim is—

1. A steam-condenser consisting of a central water-nozzle, an induction-tube having lateral inlets inclined in the direction of the current, and a discharge-tube combined with a central live-steam nozzle located above the water-nozzle, and arranged, as described, so that the suction or inductive action produced by the steam-jet is confined to the space above the water-nozzle.

2. In combination with the combining-tube B, having a bore of uniform diameter and a series of forwardly-inclined inlets, the water-nozzle A, the feed-pipe O, the live-steam nozzle located in the feed-pipe above the water-nozzle, and a chamber or conductor, substantially as described, for supplying exhaust-steam around the exterior of the combining-tube.

3. In combination with the perforated combining-tube, constructed as described, the steam-nozzle, joined to the end of said combining-tube in inclosing-jacket I, the water-pipe O, communicating with the water-nozzle, and the steam-nozzle F, located above the water-nozzle, as described.

4. In combination with a jet-condenser, a check-valve opening toward said condenser, and an exhaust-steam pipe or conductor constructed, substantially as described, with ports or passages leading from its opposite edges toward the condenser, whereby the valve is caused to rise and fall without side motion.

5. In combination with the jet-condenser, an exhaust-steam-inlet pipe, the check-valve D, and the two ports or passages leading from above said valve on opposite sides into opposite sides of the condenser, whereby a free action of the valve and a uniform distribution of the steam within the condenser are secured.

6. In combination with the jet-condensing apparatus, substantially as herein described, an exhaust-steam-supply pipe connecting therewith, and provided with an outwardly-opening relief-valve communicating with the atmosphere, and adapted to open under the pressure of the steam, whereby the steam is caused to pass to the condenser during the maintenance of a vacuum therein, but permitted to escape without passing through the condenser in the event of a failure of the vacuum, whereby the proper action of the jet apparatus is maintained.

7. In combination with the jet-condenser, the steam-supply pipe, the relief-valve E, and the operating-lever M, connected thereto by means, substantially as described, adapted to permit a lost motion between the two, whereby the valve may be operated positively or permitted to operate freely as a check-valve, at will.

8. In combination with a jet-condenser, a starting-valve located in or below the discharge-tube and above the discharge-water level.

9. In combination with a jet-condenser, a direct passage or communication between the suction and discharge passages.

10. In combination with a jet-condenser, a suction or supply passage, its delivery-passage, a direct passage or communication between the suction and discharge passages, and a valve for controlling the communication.

11. In a jet-condenser, the combination of the water-supply or feed pipe, a water-discharge pipe, and means, substantially as described, whereby a portion of the water may be returned from the discharge-pipe directly to the feed-pipe, whereby a condenser of given dimensions may be caused to condense economically a greater or less quantity of steam.

LOUIS SCHUTTE.
JOHN GOEHRING.

Witnesses:
  W. J. BIXON,
  AXEL S. VOGT.